Nov. 14, 1967
R. S. SLOTT
3,352,936
SEPARATION PROCESS
Filed Sept. 30, 1964
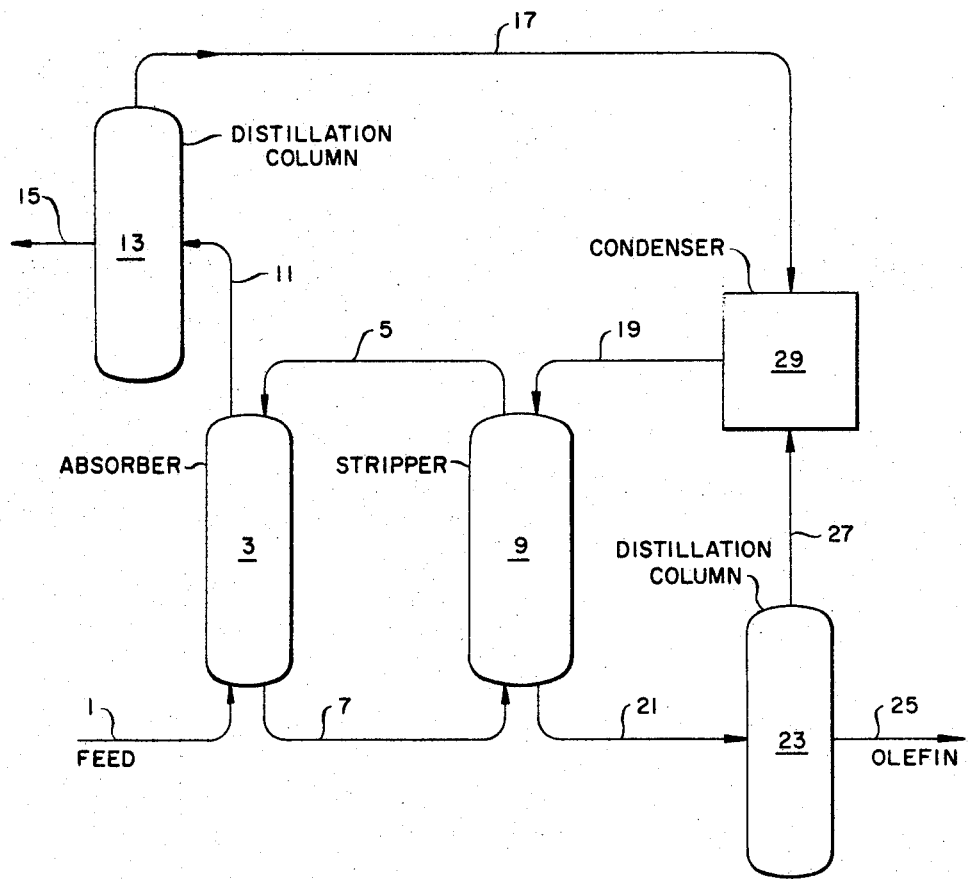
INVENTOR:
ROBERT S. SLOTT
BY: Thomas Somegal Jr
HIS ATTORNEY //<br>3,352,936<br>SEPARATION PROCESS<br>Robert S. Slott, Berkeley, Calif., assignor to Shell Oil Company, New York, N.Y., a corporation of Delaware<br>Filed Sept. 30, 1964, Ser. No. 400,310<br>13 Claims. (Cl. 260—677)

This invention relates to a process for the recovery of olefins selectively retained as a complex or addition compound with mercuric salts.

It is known that mercuric salts preferentially react with unsaturated hydrocarbons, and especially olefins, forming mercuric salt addition products. The reaction involved is best illustrated by the following equation:

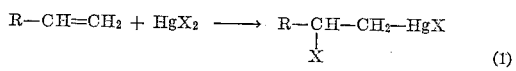

$$R-CH=CH_2 + HgX_2 \longrightarrow R-\underset{X}{CH}-CH_2-HgX \qquad (1)$$

wherein R represents either hydrogen or a substituted or unsubstituted hydrocarbon radical and X is an anion such as acetate, nitrate, etc.

It is further known that the specific olefin structure has a definite and substantial effect on the reaction velocity in the formation of specific olefin-mercury addition products. For example, the α-olefins react more rapidly than olefins unsaturated at other than a terminal position. Therefore, it is possible to isolate certain specific olefins by employing the relative reactivity of the mercuric salt reaction for certain olefins contained in a mixture of organic compounds.

Although methods are known for regenerating the olefinic complexes from a mercury-olefin addition product, e.g., by reversing this reaction through decomposition in the presence of a strong acid, i.e., a halide acid, e.g., hydrochloric acid (see British Patent No. 835,770, issued May 25, 1960), no industrial application of this phenomenon has been achieved primarily because of the cost of mercuric ion regeneration.

It is therefore a principal object of this invention to concentrate and remove specific olefins from a feed stream containing a mixture of organic compounds by selectively reacting the desirable olefins with a mercury salt. It is a further object of this invention to recover the olefins from an olefin-mercuric salt addition reaction by exchange with another olefin. Other objects will be apparent and the objects will be better understood from the description of the invention which is given hereinafter and by reference to the accompanying drawing wherein:

The single figure is a simplified flow diagram illustrating a preferred mode of practicing the invention.

Now, in accordance with this invention, it has been found that olefins, which selectively complex with mercuric salts when in admixture with other hydrocarbons such as paraffins, can be expeditiously recovered from a mercuric salt solution by employing another olefin to displace those olefins of dissimilar carbon number which originally reacted with the mercuric salt solution. This willingness of some mercuric salts when in a combined state, to displace one olefin and exchange it for another dissimilar olefin of greater or lesser carbon number will be described herein by the term "vicinal exchange."

It has further been found that the effectiveness of specific mercuric salts in this invention is dependent on the rates of three reactions, those being (1) the rate of alkoxy mercury-olefin compound formation, (2) the rate of vicinal exchange and (3) the rate of chemical decomposition.

Certain of the mercuric salts which are known to form adducts with olefins further possess this heretofor unexpected and unobvious ability to exchange a first olefin for a second (exchange) olefin, thereby displacing the first olefin from the adduct. In this manner, certain desirable olefins can be separated from organic compound mixtures and then recovered by displacement from a solution of the mercuric salt by exchange with a dissimilar olefin. The reactive mercuric salts anticipated by this invention should further preferably possess the qualification of being substantially resistant to chemical decomposition, thereby eliminating any possible detrimental secondary reactions or undesirable oxidation reactions which would downgrade the value of the olefin product and necessitate mercuric ion regeneration.

The mercuric salts which have been found to be advantageous for this invention can be further defined as being those in which the anions form strongly ionic salts with the mercuric ion. Conversely, if the anion of the mercuric salt forms a weak ionic complex with the mercuric ion, the addition reaction will usually not occur or will be limited in its rate to such an extent as to be of little value to the invention disclosed herein.

Examples of mercuric salts which (1) form addition products with olefins rapidly, (2) rapidly exchange one olefin for another, and (3) are not susceptible to chemical decomposition under normal isothermal conditions include, e.g., mercuric perchlorate, mercuric monofluoroacetate, mercuric difluoroacetate, mercuric trifluoroacetate, mercuric sulfonates of methane, toluene and benzene and the like. Mercuric nitrate is the most preferred.

It has been found that the rate of the ionic reaction of the mercuric salt with the olefin can be greatly enhanced by the presence of certain solvents, especially a solvent which contains an active hydrogen. Such a solvent containing an active hydrogen, hereinafter described as a polar solvent, reacts with a mercuric salt, in the presence of an olefin, as defined by the following equation:

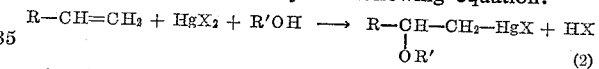

$$R-CH=CH_2 + HgX_2 + R'OH \longrightarrow R-\underset{\underset{R'}{O}}{CH}-CH_2-HgX + HX \qquad (2)$$

wherein R and X are defined supra and R′ is a hydrocarbon.

Solvents which have been found to be useful in the reactions of olefins and the mercuric salts of this invention, are preferably, those which (1) dissolve the mercuric-olefin compound, (2) do not dissolve the exchange olefin or the paraffins, (3) are not soluble in either the exchange olefin or the paraffins, (4) have low viscosity and (5) undergo no side reactions.

Such polar solvents include alcohols, preferably alcohols containing 1 to 3 carbons; and alcohol derivatives. Examples of suitable solvents include methanol, ethanol, propanol, isopropanol, trifluoroethanol, perfluoroalcohols, sulfolanol, nitroethanol, nitrobutanol and the like. Fluoroalcohols are useful when it is desirable to separate low molecular weight olefins, such as ethylene, propylene, etc. Furthermore, solvent containing functional groups having an active hydrogen will add to the olefin-carbon atom in direct proportion to their nucleophilic properties. For example, it has been found that methoxy mercuric-olefin compounds form in methanol-water mixtures.

One advantageous process scheme for carrying out the instant invention is through the use of vicinal exchange with a multistage contactor. However, in such a process it is necessary that the quantity of solvent dissolved in the non-olefin portion of the feed mixture be as small as possible to make the separation economical. Distribution coefficients for the mercury complex and the mercuric addition product in a polar solvent such as methanol ($1/K_{Hg}{}^D = 10.1$) and the insolubility of the solvent in the feed can be further enhanced by the addition of a second polar solvent. Certain materials have been found to be especially useful in improving the distribution parameters of the solvent, thereby resulting in less solvent being retained by the organic compound mixture, i.e., the non-polar phase, from which the desired olefin has been removed by adduction with the alkoxy-mercuric salt in solution.

Table I illustrates the improvement of distribution parameters obtained when, e.g., water or sulfolane were added to a methanol solvent at 25° C. wherein the non-polar phase is octene-1.

TABLE I.—EFFECT OF ADDING WATER OR SULFOLANE TO METHANOL AT 25° C.

| Solvent | Millimoles | $1/K_{Hg}{}^D$ | $K_{Octene}{}^D$ | Solvent in Octene-1, percent weight |
|---|---|---|---|---|
| Methanol | 493 | 2.80 | 0.936 | 6.05 |
| Methanol<br>Water | 490<br>63 | 21.90 | 4.250 | 3.01 |
| Methanol<br>Water | 492<br>276 | 8.07 | 60.5 | 2.14 |
| Methanol<br>Sulfolane | 245<br>103 | 46.7 | 5.18 | 1.06 |
| Methanol<br>Sulfolane | 128<br>149 | 67.8 | 11.4 | 0.189 |

The term "olefin" as used in this disclosure is meant to include unsubstituted as well as hydrocarbon substituted ethylenic compounds. Furthermore, acyclic olefins; diolefins, both conjugated and unconjugated; and olefinic compounds containing functional groups which do not cause side reactions such as ethers, sulfones, nitro compound, esters, aromatic compounds, fluorides, certain chlorides, etc., are also included.

The process of this invention is advantageously applicable to olefins of from 2–20 carbons and preferably olefins of from 9–15 carbons. Any olefin having from 2–20 carbon atoms can be utilized as the exchange olefin. In addition, best results are obtained when the exchange olefin differs in carbon number from the attached olefin by at least 2 carbons, either greater or lesser.

The mercuric ion is so sensitive to isomer differences, that the effect of carbon number in the initial selectively from the organic feed mixture is relatively small. By this is meant, that the relative equilibrium constant, $K^E$, when plotted against increasing carbon number for different types of olefins, is found to be a series of straight parallel lines. The slope of these lines has been found to be primarily proportional to the free energy required to add a $CH_2$ group into the mercuric solvent system.

The ability to attain an equilibrium mixture of olefins and mercuric olefin compounds constitutes one of the main features of this separation. This equilibrium attainment was not previously recognized. Prior separations of different types of olefins have been based on the relative rates of reaction of different types of olefins, discussed supra, whereas it is now clearly demonstrated (note Example III infra) that under the specific conditions, illustrated herein, equilibrium is attained.

The type selectivity shown by mercuric ion for different olefin isomers has been determined in a methanol/sulfolane solvent with mercuric nitrate. The equilibrium constant $K^E$ is illustrated by $$K^E = \frac{(Hg^{++} \text{ pentene-1})(\text{compound X})}{(Hg^{++} \text{ compound X})(\text{pentene-1})} \quad (3)$$

At 25° C. the following $K^E$ values have been found: pentene-1=1.00; decene-1=3.7; cis pentene-2=25; 2-methyl butene-1=14; 2-methyl butene-2=>59; and isoprene=>34.

Referring to the single figure, although any method of liquid-liquid contact is within the scope of the instant invention, the shown embodiment is a preferred system for continuously recovering olefins from a mixture of organic compounds by liquid-liquid countercurrent extraction and displacement of the desired olefins with an exchange olefin in a countercurrent stripper. In the drawing, a feed mixture of organic compounds containing olefins is passed through line 1 into multistage absorber 3 wherein the mixture countercurrently contacts a complex of mercuric salt, exchanger olefin and polar solvent introduced via line 5. The polar solvent containing the mercuric salt complexed with the displacing olefins is removed via line 7 and passes to a countercurrent stripper 9. The light liquid stream containing the exchanger olefin and non-reactive feed components is removed via line 11 and passes to distillation column 13 wherein the non-reactive feed components are removed via line 15 and the exchanger olefin is removed by line 17. The mercury-olefin mixture and the polar solvent introduced into stripper 9 is subjected to the countercurrent flow of the exchange olefin entering via line 19. Mercury-exchange olefin and polar solvent(s) are withdrawn via line 5 for recycle to the absorber 3. The desired olefins and the exchange olefin leave stripper 9 via line 21 and are introduced into distillation column 23 from which olefins are recovered via line 25 and the exchange olefin is recycled via line 27 to condenser 29 wherein it combines with the exchange olefin recovered via line 17. The combined stream in condenser 29 is returned via line 19 to stripper 9 for further treatment.

Details as to the relative sizes, shapes and placement of the pieces of equipment and provision for gas compressors, valves, baffles, fluid seals, condensers, heaters, reflux equipment and the like are omitted for clarity since they will be readily supplied by those skilled in the relevant art.

Because elevated temperatures cause reduction of the alkoxy mercuric-olefin complex and formation of undesirable by-products, it is preferred to perform the absorption and stripping operations of this invention at as low a temperature as possible keeping in mind, of course, the limiting feature of viscosity of the polar solvent. The temperature range which is advantageous includes from about 0 to 60° C., with the preferred range being about that of room temperature, e.g., from about 20 to about 30° C.

The process of this invention advantageously employs the mercuric salts in amounts from 0.5–5 moles of mercuric ion per liter of solvent. Furthermore, it is advantageous to employ a solvent containing from about 25% to 75% of a polar solvent such as methanol in conjunction with from about 75% to about 25% of a second polar solvent such as sulfolane. When using a methanol/sulfolane solvent, the ratio of from 2:3 to 10:1 has been found most advantageous. A solvent system employing about 50% methanol and 50% sulfolane has been found to be especially useful.

Although any amount of organic feed stream may be passed into liquid-liquid contact with the mercuric salt and polar solvent, it is most advantageous if the organic feed to mercuric salt ratio is kept between 10:1 to 1:10, with 1:1 being preferred. However, other ratios may be suitable depending on the degree to which the olefin is required to be removed.

The number of stages or plates, in the absorber, stripper, or distillation column can vary depending, of course, upon the degree of purity required in the final product.

The following specific examples of the invention will serve to more clearly illustrate the application of the invention, but the details thereof are not to be construed as limiting the invention.

EXAMPLE I

To 20 milliliters of methanol were added 6.853 grams of mercuric nitrate. To 14.5189 grams of n-decane were added 2.3304 grams of n-octene-1. The two solutions were shaken in a separatory funnel for two minutes at room temperature. The two phases were then separated. The decane phase was found to contain 0.085 gram of n-octene-1, 0.218 gram of methanol and 12.69 grams of n-decane. The methanol phase, after decomposition of the mercuric nitrate olefin compound yielded 2.38 grams of n-octene-1 and 2.04 grams of n-decane.

EXAMPLE II

Vicinal exchange of octene-1 for cis pentane-2

To a solution of 5 milliliters of methanol and 15 milliliters of sulfolane was added 6.767 grams of mercuric nitrate. Then 1.402 grams of cis pentene-2 was added and the solution became homogeneous with the formation of the mercuric addition compound. To 14.51 grams of decane was added 2.247 grams of the exchange olefin, octene-1. The decane solution was then shaken with the methanol-sulfolane solution for five minutes in a 60 cubic centimeter separatory funnel at room temperature (~24° C.). The two phases were separated. Analysis of the decane phase showed 1.015 grams of cis pentene-2, 0.447 gram of octene-1, and 13.83 grams of decane. Less than 0.010 gram of methanol was in the decane phase.

The mercury addition compound was decomposed and 2.026 grams of n-heptane was introduced to capture the olefins released. Analysis of the heptane phase showed that 0.358 gram of cis pentene-2, 1.840 grams of the exchange olefin, octene-1 and 0.35 gram of decane were in the methanol-sulfolane phase.

EXAMPLE III

Case A.—Vicinal exchange of n-octene-1 for n-hexene-1

To a solution of 15 milliliters sulfolane and 5 milliliters methanol was added 6.8412 grams of mercuric nitrate and 1.6989 grams of n-hexene-1. To 14.5023 grams of n-decane was added 2.2629 grams of the exchange olefin, n-octene-1. The two solutions were vicinal exchanged by combining and shaking in a separatory funnel for five minutes at room temperature. Analysis of the decane phase showed 0.646 gram hexene-1, 1.264 grams octene-1, 0.035 gram methanol and 14.08 grams of n-decane. The methanol-sulfolane phase, after decomposition of the mercuric olefin addition compound, yielded 0.908 gram n-hexene-1, 1.024 grams n-octene-1 and 0.2428 gram decane.

Case B.—Vicinal exchange of hexene-1 for n-octene-1

To a solution of 15 milliliters of sulfolane and 5 milliliters of methanol was added 6.8423 grams mercuric nitrate and 2.2517 grams of n-octene-1. To 14.4969 grams n-decane was added 2.2047 grams of the exchange olefin, hexene-1. Vicinal exchange resulted when the two solutions were combined and shaken in a separatory funnel at room temperature for five minutes. The phases were then separated. The decane phase contained 1.028 grams hexene-1, 1.388 grams octene-1, 0.045 gram methanol and 14.10 grams decane. The methanol-sulfolane phase yielded, after decomposition of the mercuric nitrate olefin compound by concentrated hydrochloric acid, 1.091 grams of n-hexene-1, 0.916 gram of n-octene-1 and 0.291 gram decane.

The equilibrium constant, K, defined as the moles of n-hexene-1 combined with mercuric nitrate times the moles of uncombined n-octene-1, divided by the product of the moles of n-octene-1 combined with mercuric nitrate and the moles of uncombined n-hexene-1 was 1.73 for Case A and 1.96 for Case B.

EXAMPLE IV

Vicinal exchange of n-dodecene-1 for n-hexene-1

To 25 milliliters of methanol was added 3.43 grams of mercuric nitrate and 0.8608 gram of n-hexene-1. The addition of the olefin caused the mercuric nitrate to dissolve because of the formation of the mercury addition compound. To 25 milliliters of decane was added 1.7532 grams of n-dodecene-1. The "vicinal exchange" was performed by shaking the decane solution with the methanol solution in a separatory funnel for five minutes at room temperature. The phases were separated. The decane phase contained 0.1668 gram of hexene-1, 1.034 grams of n-dodecene-1, 0.135 gram of methanol and 0.071 gram of mercury. The mercury olefin addition compound in the methanol phase was decomposed. The methanol phase contained 0.572 gram of n-hexene-1, 0.623 gram of the exchange olefin, dodecene-1, and 2.294 grams of decane.

EXAMPLE V

To 20 milliliters of 2-nitrobutanol was added 6.7640 grams of mercuric nitrate. To 20 milliliters (14.5112 grams) of n-decane was added 2.8052 grams of n-dodecene-1. The decane solution was shaken with the nitrobutanol mercuric nitrate mixture in a separatory funnel for five minutes at room temperature. The phases were separated. The decane phase contained 13.50 grams decane and 0.00 grams n-dodecene-1. The nitrobutanol phase was decomposed yielding 2.80 grams of dodecene-1 and 0.98 gram of n-decane.

EXAMPLE VI

To 20 milliliters of decane was added 2.80 grams of dodecene-1. This solution was shaken with a solution composed of 15 milliliters of sulfolane and 5 milliliters of methanol in a separatory funnel for five minutes at room temperature. After separating the two phases, the sulfolane/methanol phase was analyzed for dodecene-1. Less than 0.01 gram of dodecene-1 was found.

I claim as my invention:

1. A process for the recovery of olefins from a first hydrocarbon feed stream containing olefins comprising:
   (1) introducing said feed stream into a solution of mercuric salt thereby selectively retaining olefins from said first feed in said solution and removing the unretained portion of said first feed stream; and
   (2) subsequently introducing into said solution a second stream containing an exchange olefin which differs from the olefins contained in the first feed by at least two carbon atoms, whereby said exchange olefin displaces olefins retained from said first feed stream by said solution and recovering said olefins from said first feed stream.

2. A process in accordance with claim 1 wherein the first feed stream is composed of a mixture of olefins and paraffins.

3. A process in accordance with claim 1 wherein the first feed stream and solution of mercuric salt are introduced into countercurrent flow to each other in a liquid-liquid contacting means.

4. A process in accordance with claim 1 wherein said olefins have from 2 to 20 carbons.

5. A process in accordance with claim 1 wherein said exchange olefin has from 2 to 20 carbons.

6. A process in accordance with claim 1 wherein said mercuric salt is mercuric nitrate.

7. A process in accordance with claim 1 wherein the solution of mercuric salt contains a polar solvent.

8. A process in accordance with claim 7 wherein the polar solvent is methanol.

9. A process in accordance with claim 7 wherein the polar solvent is nitrobutanol.

10. A process in accordance with claim 7 wherein the polar solvent is nitroethanol.

11. A process in accordance with claim 7 wherein the polar solvent is a perfluoroalcohol.

12. A process in accordance with claim 7 wherein a second polar solvent is present.

13. A process for the recovery of olefins of from 2–20 carbon atoms, from a first feed stream composed of a mixture of olefins and paraffins comprising:
   (1) introducing said stream into a solution of mercuric nitrate in countercurrent liquid-liquid contact thereby selectively retaining α-olefins in said solution and removing the unretained portion of said first feed stream; and
   (2) subsequently introducing into said solution a second countercurrent stream containing an exchange α-olefin of from 2 to 20 carbons, which exchange α-olefin differs from the α-olefins in said first feed stream by at least two carbon atoms, whereby said exchange α-olefin displaces α-olefins retained from said first feed stream by said solution and recovering said α-olefins from said first feed stream.

References Cited

UNITED STATES PATENTS

| | | | |
|---|---|---|---|
| 1,315,511 | 9/1919 | Curme | 260—677 |
| 2,395,956 | 5/1946 | Soday | 260—677 |
| 2,543,478 | 2/1951 | Tooke et al. | 260—677 |
| 2,953,611 | 9/1960 | Spengler | 260—677 |

DELBERT E. GANTZ, *Primary Examiner.*

ALPHONSO D. SULLIVAN, *Examiner.*

J. D. MYERS, *Assistant Examiner.*